United States Patent
Soliman et al.

(10) Patent No.: US 10,457,023 B2
(45) Date of Patent: Oct. 29, 2019

(54) BI-AXIALLY STRETCHED ARTICLE AND SILAGE FILM

(71) Applicants: SAUDI BASIC INDUSTRIES CORPORATION, Riyadh (SA); SABIC GLOBAL TECHNOLOGIES B.V., Bergen op Zoom (NL)

(72) Inventors: Maria Soliman, Schalbruch (DE); Johannes Peter Antonius Martens, Elsloo (NL)

(73) Assignees: SAUDI BASIC INDUSTRIES CORPORATION, Riyadh (SA); SABIC GLOBAL TECHNOLOGIES B.V., Bergen op Zoom (NL)

( * ) Notice: Subject to any disclaimer, the term of this patent is extended or adjusted under 35 U.S.C. 154(b) by 142 days.

(21) Appl. No.: 15/036,328

(22) PCT Filed: Nov. 14, 2014

(86) PCT No.: PCT/EP2014/074569
§ 371 (c)(1),
(2) Date: May 12, 2016

(87) PCT Pub. No.: WO2015/071396
PCT Pub. Date: May 21, 2015

(65) Prior Publication Data
US 2016/0297186 A1 Oct. 13, 2016

(30) Foreign Application Priority Data
Nov. 14, 2013 (EP) .................................... 13192917
Apr. 9, 2014 (EP) .................................... 14164059

(51) Int. Cl.
*B32B 27/02* (2006.01)
*B32B 27/32* (2006.01)
(Continued)

(52) U.S. Cl.
CPC ................ *B32B 27/32* (2013.01); *B32B 9/02* (2013.01); *B32B 9/045* (2013.01); *C08J 5/18* (2013.01);
(Continued)

(58) Field of Classification Search
CPC .......... B32B 2250/40; B32B 2307/518; B32B 2307/7244; B32B 2307/7246;
(Continued)

(56) References Cited

U.S. PATENT DOCUMENTS 4,895,769 A * 1/1990 Land ........................ G02B 1/08
264/1.34
5,082,616 A 1/1992 White et al.
(Continued)

FOREIGN PATENT DOCUMENTS

CA 2060650 A1 10/1991
WO 2007118280 A1 10/2007
(Continued)

OTHER PUBLICATIONS

International Search Report for International Application No. PCT/EP2014/074569; International Filing Date: Nov. 14, 2014; dated Dec. 5, 2014; 4 Pages.
(Continued)

*Primary Examiner* — Lawrence D Ferguson
(74) *Attorney, Agent, or Firm* — Cantor Colburn LLP

(57) ABSTRACT

The present invention relates to biaxially stretched article obtained by stretching a thermoplastic composition in a machine direction and a transverse direction at elevated temperature, said thermoplastic composition comprising: —a polyolefin phase containing at least one polyolefin, —a starch phase containing thermoplastic starch, —at least one compatibilizer selected from the group consisting of ethylene vinyl alcohol copolymers, block saponified poly-
(Continued)

Figure 1:
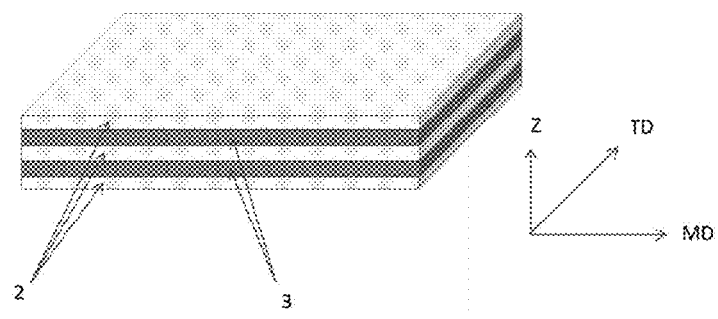

vinyl acetate and random terpolymers of ethylene, butylacrylate and maleic anhydride, wherein the total of the at least one polyolefin, the thermoplastic starch and the at least one compatibilizer is more than 80 wt % of the weight of the thermoplastic composition and wherein the article has a layered morphology with alternating layers of starch phase and polyolefin phase, said layers of starch phase and polyolefin phase extending in machine direction and transverse direction.

20 Claims, 1 Drawing Sheet

(51) Int. Cl.
*C08J 5/18* (2006.01)
*B32B 9/02* (2006.01)
*B32B 9/04* (2006.01)

(52) U.S. Cl.
CPC . *B32B 2307/518* (2013.01); *B32B 2307/7244* (2013.01); *B32B 2307/7246* (2013.01); *B32B 2307/75* (2013.01); *B32B 2410/00* (2013.01); *C08J 2323/06* (2013.01); *C08J 2403/02* (2013.01)

(58) Field of Classification Search
CPC ............ B32B 2307/75; B32B 2410/00; B32B 27/32; B32B 9/02; B32B 9/045
See application file for complete search history.

(56) References Cited

U.S. PATENT DOCUMENTS

| | | |
|---|---|---|
| 5,415,827 A | 5/1995 | Tomka et al. |
| 6,605,657 B1 | 8/2003 | Favis et al. |
| 6,958,369 B2 | 10/2005 | Berger et al. |
| 2007/0042207 A1 | 2/2007 | Berger et al. |
| 2008/0182113 A1 | 7/2008 | Hausmann et al. |
| 2009/0312462 A1 | 12/2009 | Oakley et al. |
| 2012/0009387 A1 | 1/2012 | Wang et al. |
| 2012/0150137 A1 | 6/2012 | Wang et al. |
| 2015/0118470 A1 | 4/2015 | Soliman et al. |
| 2017/0021594 A1 | 1/2017 | Soliman et al. |

FOREIGN PATENT DOCUMENTS

| | | |
|---|---|---|
| WO | 2008037744 A2 | 4/2008 |
| WO | 2008037749 A2 | 4/2008 |
| WO | 2009022195 A1 | 2/2009 |
| WO | 2010012041 A1 | 2/2010 |
| WO | 2010131134 A2 | 11/2010 |
| WO | 2011009165 A1 | 1/2011 |
| WO | 2013178746 A1 | 12/2013 |
| WO | 2015071396 A1 | 5/2015 |

OTHER PUBLICATIONS

Written Opinion of the International Searching Authority for International Application No. PCT/EP2014/074569; International Filing Date: Nov. 14, 2014; dated Dec. 5, 2014; 4 Pages.

* cited by examiner

BI-AXIALLY STRETCHED ARTICLE AND SILAGE FILM

CROSS REFERENCE TO RELATED APPLICATIONS

This application is a 371 of International Application No. PCT/EP2014/074569, filed Nov. 14, 2014, which claims priority to EP 14164059.9, filed Apr. 9, 2014 and EP 13192917.6, filed Nov. 14, 2013 which are incorporated herein by reference in their entirety.

The present invention relates to a biaxially stretched article obtained by stretching a thermoplastic composition in a machine direction and a transverse direction at elevated temperature, said thermoplastic composition comprising a polyolefin phase containing at least one polyolefin, a starch phase containing thermoplastic starch, and at least one compatibiliser. The present invention further relates to the use of a biaxially stretched article in or for the manufacture of a silage film and wherein the biaxially stretched article is obtained by stretching a thermoplastic composition in a machine direction and a transverse direction at elevated temperature, said thermoplastic composition comprising a polyolefin phase containing at least one polyolefin, a starch phase containing thermoplastic starch, and at least one compatibiliser.

Conventionally, silage used as a feed of domestic animals is produced by mowing grass and the like, storing them in a silo and fermenting them under an anaerobic condition. Such a fermentation is caused by an action of lactic acid bacteria and the like adhered to the grass and the like, which enables the inhibition of the activity of aerobic bacteria and generation of mold which cause decomposition of the grass, by the increase of compositional ratio of organic acids such as acetic acid and lactic acid in the silage to lower pH, and enables long-term storage of the feed. In addition, since such organic acids can be important nutrient source of domestic animals, they produce a good effect for the health improvement of domestic animals. In order to prepare such silage, it was conventional to use a tower silo. However, the tower silo is large in scale and is labor intensive with respect to loading and unloading. In addition, there was also a danger of causing collapse of the tower due to its insufficient strength. Accordingly, a simplified silo which uses a thermoplastic resin film has been spreading in recent years. For example, there may be mentioned a bunker silo in which the side walls and bottom floor are made out of concrete. Materials such as grass are spread thereon and the upper part is covered with a thermoplastic resin film. In another form a bag silo is formed in which materials are (tightly) packed in a large bag made of a thermoplastic resin film and the bag is sealed In yet another form a wrap silo may be formed by mowing grass or other forage plants, collecting said forage plants and reshaping them into a cylindrical shape (roll bale) or rectangular shape (square bale) using a large machine, and such a reshaped product is then wrapped with a broad film made of a thermoplastic resin.

Of these, particularly the last mentioned wrap silo is widely used. In the wrap silo, since the reshaped grass is sealed and wrapped by rolling up with a film, amount of oxygen inside the film is lowered to change to an anaerobic condition so that the silage is prepared. The films referred to hereinabove are generally referred to as silage film. Said in a different manner, silage film is an agricultural film used in farmland for protection and storage of forage, silage, hay and maize in particular in areas where the growth period of herding grass is relatively short.

Conventionally, a polyethylene resin has been used as silage film. However, in the case of using a silage film made of a polyethylene resin, it causes a problem that mold and/or yeast are generated on the forage close to the film and the inner surface of the film is covered with the mold when the silage is preserved for a prolonged period of time. This mold or yeast formation is attributed to the relatively poor oxygen permeability of polyethylene.

This problem may be solved by either increasing the thickness of the polyethylene film or my laminating the polyethylene with other materials that show an improved (i.e. lower) oxygen permeability. These solutions are either more complex in their manufacturing process or less cost effective. Consequently there is a need for a cost effective silage film (or silage cover) that has sufficient oxygen barrier properties.

With an ever increasing emphasis on sustainability and the environment, there has been a corresponding increase in research directed toward developing polymeric materials derived from or comprising renewable biologically derived components.

Much of the research to date in developing such polymeric materials has focused on utilising naturally occurring bio-polymers such as starch. Starch is attractive in that it is derived from renewable resources (i.e. plant products), readily available and relatively inexpensive. However, the mechanical properties of starch in its native form are quite poor compared with those of petroleum derived (i.e. "synthetic") polymers. The mechanical properties of starch can be improved by melt mixing it with a plasticiser such as a polyhydric alcohol so as to form thermoplastic starch, sometimes abbreviated as TPS. However, the improved mechanical properties of thermoplastic starch still remain relatively poor compared with those of synthetic polymers. Thermoplastic starch is therefore not considered a viable alternative to petroleum derived polymers.

In attempt to derive the benefits of starch and petroleum derived polymers, a considerable amount or research has been directed toward developing blends of polyolefins and thermoplastic starch. However, combining relatively hydrophilic starch with polyolefins which are hydrophobic, to produce blends with good mechanical properties has proven difficult in practice. In particular, melt processing starch or TPS with polyolefins generally results in the formation of blends having a multi-phase discontinuous morphology.

WO2010/012041 discloses a composition comprising very low density polyethylene having a density of less than 0.905 g/cm$^3$, ethylene acrylic acid copolymer and thermoplastic starch and/or the constituent components thereof. Such compositions have been found to demonstrate excellent compatibility between the polymeric components as a blend and may be used to provide polymer products that exhibit excellent properties. Melt processed polymer compositions were found to exhibit desirable attributes such as low sensitivity to moisture, a surface amenable to printing, a high content of starch, excellent mechanical properties such as %-elongation. These desirable attributes are believed to stem at least in part from the ability of the compositions to provide the thermoplastic starch and polyethylene components in a highly compatibilised form. In some embodiments of the invention, the TPS and polyethylene components were believed to form a stable co-continuous phase morphology.

US 2012/0009387 discloses a flexible polymeric film comprising from about 5% to about 45% of a thermoplastic starch, from about 55% to about 95% of a polyolefin or mixtures of polyolefins, and from about 0.5% to about 8% of a compatibiliser. which has a non-polar backbone and a polar functional monomer or a block copolymer of both the non-polar block and a polar block, or a random copolymer of a polar monomer and nonpolar monomer. The thermoplastic starch in this film is incorporated as particles.

CA 2,060,650 discloses a single-layer or multiple-layer foil of substantially reduced gas-permeability which comprises at least one layer which consists, at least in part, of substantially thermoplastic starch. In order that this single layer or multiple-layer foil is at least approximately insensitive to moisture it is proposed that at least one layer comprises furthermore at least one hydrophobic polymer, such as a polyolefin, which is mixed with the starch upon the production of said at least one layer, and/or that the starch is at least partially cross-linked on the surface of said at least one layer and/or that said at least one layer is covered by at least one additional layer which is at least approximately insensitive to moisture.

WO2009/022195 discloses compositions comprising a polyolefin, a compatibiliser, a starch and a plasticizer. Said compositions may be used to manufacture a film material.

U.S. Pat. No. 6,605,657 discloses a composition of matter comprising a co-continuous blend of thermoplastic starch and synthetic polymer, wherein the co-continuous blend comprises a mixture of a thermoplastic starch phase and a synthetic polymer phase, and wherein both thermoplastic starch and synthetic polymer phases, when considered separately, are essentially constituted of a network of interconnected domains of thermoplastic starch and synthetic polymer, respectively, and wherein said composition is substantially water free. The synthetic polymer may be polyethylene.

WO 2011/009165 discloses a multilayer film comprising at least a tri-layer structure, said tri-layer structure being made up of a core polymer layer interposed between two covering polymer layers that each comprises polyethylene, wherein the core polymer layer comprises a melt blend of polyethylene, thermoplastic starch, and ethylene acrylic acid copolymer.

U.S. Pat. No. 5,415,827 discloses a process for improving the quality and particularly the mechanical properties of single- or multi-ply sheets with at least one ply consisting at least in part of essentially moisture-free thermoplastically processable starch, which is the melted mixture product of essentially moisture-free starch and an additive having a solubility parameter of over 15 cal$^{1/2}$ cm$^{-3/2}$, a vapor pressure of lower than 1 bar in the melting range of the starch/additive mixture, and which lowers the melting point of the starch so that the melting point of the starch/additive mixture lies below the decomposition temperature of the starch, characterized by the fact that the materials used to form the plies are dried before or during production of the sheets at least to the point where they are essentially moisture-free, the sheets are produced and the produced sheets are thereafter stretched mono-axially or biaxially. The ply containing the starch can either consist basically almost entirely of thermoplastically processable starch or else consist of a polymer blend containing thermoplastically processable starch and at least a polyolefin such as polyethylene or polypropylene, and preferably a phasing or bonding agent in the form of a block copolymer. After these single- or multi-ply sheets have been produced, they should be stretched mono-axially or biaxially, which stretching may be carried out at room temperature.

US2008/0182113 discloses a composition comprising a biopolymer, an olefin copolymer, and an optional polymer. The biopolymer may be modified starch and is present in an amount of at least 85% based on the dry weight of the composition. The olefin copolymer may be a copolymer of ethylene and maleic anhydride. The optional polymer includes ethylene copolymer, polyvinyl butyral copolymer, or combinations thereof; the ethylene copolymer includes ethylene alkyl(meth)acrylate copolymer, ethylene vinyl acetate copolymer, ethylene acid copolymer or ionomer thereof, poly(vinyl alcohol), poly(hydroxyalkanoic acid), polyester, polyamide, polyurethane, polyolefin, polycaprolactone, copoly-ether-ester, polyalkylene oxide, or combinations of two or more thereof. The compositions may be formed into films and sheets by extrusion to prepare both cast and blown films.

An object of the present invention is to provide a thermoplastic composition in the form of an article having a multi-layered structure comprising layers of starch and polyolefin which article can be produced directly from said thermoplastic composition, i.e. which production does not require co-extrusion or lamination of multiple layers.

A further object of the present invention is to provide a bi-axially stretched article that has a smooth surface with a high gloss and a low haze and exhibits a desirable combination of at least some of printability, low oxygen permeability, low water vapour permeability and acceptable mechanical properties. It is also desirable that the dispersion quality is good, i.e. the layers of polyolefin and thermoplastic starch both form substantially continuous layers seen in machine direction and transverse direction and have a low proportion of isolated domains of thermoplastic starch and/or polyolefin.

Yet a further object of the present invention is to provide a multilayer film having layers of thermoplastic starch and layers of polyolefin, which layers do not delaminate.

Yet a further object of the present invention is the provision of a cost-effective silage film having an appropriate combination of water (vapor) permeability, oxygen permeability and mechanical properties.

A particular object of the present invention is to provide a bi-axially stretched article that exhibits the combination of both low oxygen permeability and low water vapour permeability.

To that extent the present invention is directed to a biaxially stretched article obtained by stretching a thermoplastic composition in a machine direction and a transverse direction at elevated temperature, said thermoplastic composition comprising
 a polyolefin phase containing at least one polyolefin,
 a starch phase containing thermoplastic starch
 at least one compatibiliser selected from the group consisting of ethylene vinyl alcohol copolymers, block saponified polyvinyl acetate and random terpolymers of ethylene, butylacrylate and maleic anhydride,
 wherein the total of the at least one polyolefin, the thermoplastic starch and the at least one compatibiliser is more than 80 wt % of the weight of the thermoplastic composition and
 wherein the article has a layered morphology with alternating layers of starch phase and polyolefin phase, said layers of starch phase and polyolefin phase extending in machine direction and transverse direction.

The skilled person will understand that since the article is obtained from the thermoplastic composition it is in fact the thermoplastic composition after being stretched that has the layered morphology so that, said in another way, the present invention is directed to a biaxially stretched article obtained by stretching a thermoplastic composition in a machine direction and a transverse direction at elevated temperature, said thermoplastic composition comprising
  a polyolefin phase containing at least one polyolefin,
  a starch phase containing thermoplastic starch
  at least one compatibiliser selected from the group consisting of ethylene vinyl alcohol copolymers, block saponified polyvinyl acetate and random terpolymers of ethylene, butylacrylate and maleic anhydride,
wherein the total of the at least one polyolefin, the thermoplastic starch and the at least one compatibiliser is more than 80 wt % of the weight of the thermoplastic composition,
wherein the thermoplastic composition, after being stretched, has a layered morphology with alternating layers of starch phase and polyolefin phase, said layers of starch phase and polyolefin phase extending in machine direction and transverse direction.

Unlike the prior art the present invention provides a multi-layer structure of thermoplastic starch polyolefins without the need for a multilayer lamination or co-extrusion step. The properties of the article of the present invention are similar or even improved over known multilayer materials.

In particular the present inventors found that as a result of the layered morphology the article of the present invention may provide the desirable combination of low oxygen permeability and low water vapour permeability. Such combination cannot be obtained for polyolefins as such. For example, it is known that polyethylene has an enormously low water vapour permeability, yet the oxygen permeability is too high. For certain applications this requires the polyethylene to be part of a multi-layer film, in which an EVOH middle layer is required and the availability of a 5-layer film line, both making the production of this multi-layer film much less cost-effective. In addition, the thermoplastic starch content in the article of the present invention introduces more polarity, resulting in a lower surface tension which is a desirable property in view of printability. The article of the present invention therefore obviates, or at least reduces the need for surface treatment of the article prior to printing. The present inventors have further found that the article shows acceptable mechanical properties which the present inventors ascribe mainly to the presence of the at least one compatibiliser which enhances the bond between the starch phase and the polyolefin phase.

The present inventors have found that the combination of polyolefin, thermoplastic starch and a compatibiliser selected from the group consisting of ethylene vinyl alcohol copolymers, block saponified polyvinyl acetate and random terpolymers of ethylene, butylacrylate and maleic anhydride leads to an article having alternating layers with desirable properties, requiring essentially no other components. In particular, it was found that the surface roughness of the obtained article is highly dependent on the type of the compatibiliser and the compatibilisers mentioned above was necessary for obtaining a high gloss and a low haze surface of the article.

The small number of required components allows an easy production of the article. Further, it was found that the presence of small or no amount of polyester in the composition leads to a smoother surface of the article and a better dispersion quality. Accordingly the article of the present invention meets at least some of the aforementioned objects.

The term layered morphology with alternating layers as used herein is intended to mean a morphology wherein layers of starch phase and polyolefin phase are observed predominantly in alternating stacked formation seen in MD and TD and wherein the layers extend in machine direction and transverse direction, meaning that the layers of polyolefin and thermoplastic starch form substantially continuous layers seen in machine direction and transverse direction and are not a mere combination of isolated domains in said directions.

A skilled person will nevertheless understand that some isolated domains of thermoplastic starch and/or polyolefin may nevertheless be formed during the production of the article according to the present invention. Such isolated domains will however form a minor part of the article of the present invention, typically in an amount less than a few weight percent, such as for example less than 5 wt %, preferably less than 3 wt %, more preferably less than 1 wt %. Ideally there are no isolated domains of starch phase and/or polyolefin phase and the respective layers are continuous in both machine direction and transverse direction.

In an embodiment the present invention relates to a biaxially stretched article obtained by stretching a thermoplastic composition in a machine direction and a transverse direction at elevated temperature, said thermoplastic composition consisting of:
  a polyolefin phase containing at least one polyolefin, and
  a starch phase containing thermoplastic starch and
  at least one compatibiliser selected from the group consisting of ethylene vinyl alcohol copolymers, block saponified polyvinyl acetate or random terpolymers of ethylene, butylacrylate and maleic anhydride and mixtures thereof,
wherein the total of the at least one polyolefin, the thermoplastic starch and the at least one compatibiliser is more than 80 wt % of the weight of the thermoplastic composition,
wherein the article, i.e. the thermoplastic composition after being stretched, has a layered morphology with alternating layers of starch phase and polyolefin phase, said layers of starch phase and polyolefin phase extending in machine direction and transverse direction.

In a preferred embodiment the thermoplastic composition that is used to produce the article of the present invention comprises from 10-70 wt % of at least one polyolefin, from 10-70 wt % of thermoplastic starch and from 5-40 wt % of at least one compatibiliser.

Preferably, the thermoplastic composition comprises the at least one polyolefin and the thermoplastic starch at a weight ratio of 20:80-80:20. When the amount of the thermoplastic starch is too large, an unstable formation of a film is observed. When the amount of the thermoplastic starch is too small, the article has a relatively high oxygen permeability. Preferably, the weight ratio between the at least one polyolefin and the thermoplastic starch is 25:75-75:25, more preferably 30:70-70:30. A good production stability and desirable article properties are obtained.

Even more preferably, the weight ratio between the at least one polyolefin and the thermoplastic starch is 20:80-55:45, more preferably 20:80-50:50, more preferably 20:80-40:60, more preferably 20:80-30:70. It was found that the oxygen barrier property was particularly good while good production stability is maintained when the weight ratio between the at least one polyolefin and the thermoplastic starch is in these ranges.

Preferably, the amount of the thermoplastic starch in the thermoplastic composition is 40-75 wt %, more preferably 50-70 wt %, more preferably 60-70 wt %. It was found that the oxygen barrier property was particularly good while good production stability is maintained when the amount of the thermoplastic starch is in these ranges.

Without wishing to be bound to it, the present inventors believe that in order to obtain the layered morphology with alternating layers of starch phase and polyolefin phase a balance need to be found in the type, amount and properties of the polyolefin phase, type, amount and properties of the starch phase and type, amount and properties of the compatibiliser. In addition to that the thermoplastic composition needs to be stretched in machine direction and in transverse direction to a certain extent.

Examples of the conditions for obtaining the layered morphology are described in the experimental part of the description.

In a preferred embodiment of the present invention therefore, the thermoplastic composition comprises a polyolefin phase and a starch phase in a weight ratio of from 0.8-1.2, preferably from 0.9-1.1, more preferably from 0.95-1.05. The present inventors observed that outside these ranges a layered morphology will nevertheless be possible.

Preferably a stretch ratio in transverse direction is at least 1.5, preferably at least 2, the stretch ratio in transverse direction being defined as:

$$SR_{td} = \frac{W_1}{W_0}$$

and/or a stretch ratio in machine direction is at least 2, the stretch ratio in machine direction being defined as:

$$SR_{md} = \frac{T_0}{T_1 \times SR_{td}}$$

wherein
$SR_{md}$=Stretch ratio in machine direction
$SR_{td}$=Stretch ratio in transverse direction
$W_0$=Width of the thermoplastic composition before stretching in transverse direction [mm]
$W_1$=Width of the biaxially stretched article [mm]
$T_0$=Thickness of the thermoplastic composition before stretching in machine and transverse direction [mm]
$T_1$=Thickness of the biaxially stretched article [mm]

The stretch ratio in machine direction may also be defined based on the specifics of the process that is used for the stretching. For example in a film blowing process the stretch ratio in machine direction may be defined as the ratio between the speed of the film take up reel and the speed of the thermoplastic composition exiting the extrusion die.

In a more preferred embodiment both the stretch ratio in machine direction and the stretch ratio in transverse direction are at least 2.

Preferably the stretch ratio in machine direction is at most 20, more preferably at most 15, even more preferably at most 10. The stretch ratio in transverse direction is preferably at most 4.

For the avoidance of doubt it is to be understood that the stretch ratios as herein defined by definition are more than 1, i.e. the thermoplastic composition is required to be stretched in both machine direction and transverse direction. Similarly a "biaxially stretched" article by definition means an article that has been stretched in both machine direction and transverse direction. The stretching is carried out while the thermoplastic composition is at an elevated temperature and is essential in obtaining the layered morphology of the article according to the present invention. The stretching in machine direction and transverse direction is normally carried out simultaneously.

In view of the starch phase the temperature of the thermoplastic composition while being stretched may not be too high, because a too high temperature will cause yellowing or browning of the thermoplastic starch. The thermoplastic starch may also become brittle at too high temperatures, which is undesirable. A practical upper limit is 130° C. The lower temperature limit for the stretching depends to some extent on the thermoplastic composition, but in general it can be said that the lower limit is determined by the melting and crystallization temperature of the polyolefin phase. A practical lower limit may be 100° C., although a skilled person may easily find the practical lower limit by routine experimentation. Preferably the stretching of the thermoplastic composition is performed at a temperature above the melting points of both the thermoplastic starch and the polyolefin.

The present invention is not limited to a specific stretching process, yet it is preferred to use a film blowing technique, as such techniques are very suitable for making thin films. However other stretching techniques such as calendering may also be applied. The present invention does not exclude injection moulding processes for producing the inventive article per se, provided however that the thermoplastic composition is stretched in both a machine and transverse direction. Further variables of the injection moulding process may need to be considered for successfully producing the article of the present invention.

Preferably the viscosity of the starch phase is such that it has a Melt Flow Index (MFI) of from 2-20 preferably from 4-10 g/10 min measured in accordance with ISO 1133 at a temperature of 130° C. and under a load of 10 kg.

Preferably the viscosity of the polyolefin phase is such that it has a Melt Flow Index (MFI) of from 2-20 preferably from 4-10 g/10 min measured in accordance with ISO 1133 at a temperature of 130° C. and under a load of 10 kg.

Preferably, the polyolefin phase has an MFI of 2-15 g/10 min, more preferably 3-10 g/10 min, more preferably 3-5 g/10 min as measured according to ISO 1133 at 190° C. and 2.16 kg. The MFI in these ranges was found to be advantageous for a good oxygen barrier property.

The ratio of the MFI of the polyolefin phase and the MFI of the starch phase, both measured in accordance with ISO 1133 at a temperature of 130° C. and under a load of 10 kg is preferably from 0.5-1.5, preferably from 0.7-1.3, more preferably from 0.9-1.1. The present inventors have observed that the closer the ratio is to 1 the easier it is to obtain the layered morphology of the article according to the present invention.

The term compatibiliser as used herein is defined as a material having affinity with both the starch phase and the polyolefin phase and which material is able to improve the adhesion of the two phases at the interface so that the thermoplastic phase and the polyolefin phase can co-exist in the same article without the phases becoming physically separated. A compatibiliser suitable for use in the present invention consists of a molecular part which has high affinity and/or miscibility with the thermoplastic starch and a further molecular part which has high affinity and/or miscibility with the polyolefin. Hence in the article according to the present invention wherein the starch phase and the polyolefin phase are in the form of layers, the layers adhere well to one another and do not easily delaminate. Without willing to be bound to it the present inventors believe that without the compatibiliser the surface tension of interface between the starch phase and the polyolefin phase would be too high and that as a result thermodynamics will be the driving force towards a minimized contact surface area between the two phases, which is contrary to the formation of layers extending in machine and transverse direction which by nature will result in a significant contact surface area. Due to its nature a compatibiliser will predominantly be present at the interface between the starch phase and the polyolefin phase. The skilled person will understand that the compatibiliser will not form a separate phase in the biaxially stretched article.

Due to the non-polar nature of the polyolefin phase and the polar nature of the starch phase compatibilisers may be polymer materials having a non-polar backbone and a polar group incorporated in the backbone or grafted thereon. Such polar group may be reactive with respect to the starch and react with at least a part of the starch. Compatibilisers may also be block copolymers having blocks of non-polar and polar monomers.

In the present invention, the compatibilisers used include at least ethylene vinyl alcohol copolymers, block saponified polyvinyl acetate or random terpolymers of ethylene, butylacrylate and maleic anhydride or mixtures of at least two of these compatibilisers.

In some embodiments of the invention, the compatibilisers used in the present invention consist of ethylene vinyl alcohol copolymers, block saponified polyvinyl acetate and/or random terpolymers of ethylene, butylacrylate and maleic anhydride.

In other embodiments of the invention, other types of compatibilisers can be used in combination with the compatibilisers mentioned above. Examples of the further compatibilisers that can be used in combination with the compatibilisers mentioned above include ethylene acrylic acid copolymers, ethylene vinyl acetate copolymers, polyolefins having at least 1 wt % maleic anhydride grafted thereon, random, partially hydrolised and saponified polyvinylacetate and random terpolymers of ethylene, vinylacetate and maleic anhydride.

Preferably, the compatibiliser used in the invention is random terpolymers of ethylene, butylacrylate and maleic anhydride or random terpolymers of ethylene, butylacrylate and maleic anhydride and polyolefins having at least 1 wt % maleic anhydride grafted thereon.

The amount of the compatibiliser selected from the group consisting of ethylene vinyl alcohol copolymers, block saponified polyvinyl acetate or random terpolymers of ethylene, butylacrylate and maleic anhydride is preferably in the range of from 5-30 wt % based on the thermoplastic composition. More preferably, the amount of the compatibiliser is 5-15 wt %, more preferably 5-10 wt %, even more preferably 5-7.5 wt % based on the thermoplastic composition. It was found that too low amount of compatibiliser, e.g. less than 5 wt % based on the thermoplastic composition, led to unstable formation of the film. It was also found that too higher amount of compatibiliser was found to decrease the oxygen barrier property. It was found that the oxygen barrier property was particularly good while good production stability is maintained when the amount of the compatibiliser is in these ranges.

The total amount of the compatibiliser in the thermoplastic composition (ethylene vinyl alcohol copolymers, block saponified polyvinyl acetate or random terpolymers of ethylene, butylacrylate and maleic anhydride and any further compatibiliser) is preferably at most 30 wt %.

The thermoplastic starch used in the article of the present invention may be made from any suitable starch source such as corn, tapioca, maize, wheat, rice, potato, soy bean or any combination of at least two of these starch sources, potato starch being preferred because of its availability.

Those skilled in the art will appreciate that thermoplastic starch is a de-structured form of starch comprising one or more plasticisers. Hence, for the avoidance of doubt it should be understood that processing aids, such as plasticisers, required for making thermoplastic starch out of starch are considered as part of the thermoplastic starch. Starch is found chiefly in seeds, fruits, tubers, roots and stem pith of plants, and is a naturally derived polymer made up of repeating glucose groups linked by glucosidic linkages in the 1-4 carbon positions. Starch predominantly consists of amylose, a substantially linear polymer with molecular weight of about $1 \times 10^5$ and amylopectin, a highly branched polymer with very high molecular weight of the order $1 \times 10^7$.

Each repeating glucose unit typically has three free hydroxyl groups, thereby providing the polymer with hydrophilic properties and reactive functional groups. Most starches contain 20 to 30% amylose and 70 to 80% amylopectin. However, depending on the origin of the starch the ratio of amylose to amylopectin can vary significantly. For example, some corn hybrids provide starch with 100% amylopectin (waxy corn starch), or progressively higher amylose content ranging from 50 to 95%.

Besides the native form of starch, a chemically modified starch may also be used in the present invention. Chemically modified starch includes, but is not limited to, oxidised starch, etherificated starch, esterified starch or a combination of such chemical modifications (e.g. etherificated and esterified starch). Suitable etherificated starch includes, but is not limited to starch that is substituted with ethyl and/or propyl groups. Suitable esterified starch includes, but is not limited to starch that is substituted with actyl, propanoyl and/or butanoyl groups.

Chemically modified starch is generally prepared by reacting the hydroxyl groups of starch with one or more reagents. The degree of reaction, often referred to as the degree of substitution (DS), can significantly alter the physiochemical properties of the modified starch compared with the corresponding native starch. The DS for a native starch is designated as 0 and can range up to 3 for a fully substituted modified starch. Depending upon the type of substituent and the DS, a chemically modified starch can exhibit considerably different hydrophilic/hydrophobic character relative to native starch.

Both native and chemically modified starch generally exhibit poor thermoplastic properties. To improve such properties, the starch may be converted to thermoplastic starch. For example, native or chemically modified starch may be melt processed with one or more plasticisers. Polyhydric alcohols may be used as plasticisers in the manufacture of thermoplastic starch.

The thermoplastic starch will generally also comprise one or more polyhydric alcohol plasticisers. Suitable polyhydric alcohols include, but are not limited to glycerol, ethylene glycol, propylene glycol, ethylene di-glycol, propylene di-glycol, ethylene tri-glycol, propylene tri-glycol, polyethylene glycol, polypropylene glycol, 1,2-propanediol, 1,3-propanediol, 1,2-butanediol, 1,3-butanediol, 1,4-butanediol, 1,5-pentanediol, 1,6-hexanediol, 1,5-hexanediol, 1,2,6-hexanetriol, 1,3,5-hexanetriol, neo-pentyl glycol, trimethylol propane, pentaerythritol, mannitol, sorbitol, and the acetate, ethoxylate, and propoxylate derivatives thereof.

In one embodiment the thermoplastic starch comprises glycerol and/or sorbitol plasticisers. The plasticiser content of the thermoplastic starch will generally range from about 5 wt % to about 50 wt %, for example from about 10 wt. % to about 40 wt % or from about 10 wt. % to about 30 wt %, relative to the combined mass of the starch and plasticiser components.

The weight ratio between the glycerol and the plasticiser components (glycerol and/or solbitol) is preferably 0.3-1.0, more preferably 0.4-0.9, more preferably 0.5-0.8. It was found that It was found that the oxygen barrier property was particularly good when the weight ratio between the glycerol and the plasticiser components is in these ranges. These ranges also ensure that the transformation of semi-crystalline native starch into amorphous thermoplastic starch is completed and suitable to obtain the desirable structure of the final article.

The thermoplastic starch preferably comprises borax. It was found that the presence of borax led to an improved oxygen permeability and water permeability of the article produced from the thermoplastic composition according to the invention. Further, the presence of borax was found to result in a better homogeneity and co-continuous morphology (dispersion quality) of the polyolefin and thermoplastic starch phases in that article. The amount of borax is preferably 0.5 wt % to 8 wt %, for example 1 wt % to 4 wt %, more preferably 2 wt % to 3 wt %, based on the amount of the thermoplastic starch in the thermoplastic composition. For the avoidance of doubt, borax is a well-known boron compound known under IUPAC name sodium tetraborate decahydrate. It is further often referred to as sodium borate, sodium tetra borate or disodium tetraborate.

Although the present invention is primarily directed to the use of starch as a component for the article, the present inventors do not exclude the use of flour instead of starch, starch being a major constituent of flour.

The polyolefin in the article of the present invention is preferably selected from the group consisting of propylene homopolymers, ethylene propylene copolymers, polyethylene, high density polyethylene, medium density polyethylene, low density polyethylene, linear low density polyethylene and mixtures of at least two of the preceding polyolefins. Preferably the density of the polyolefin is at least 0.910 g/cm$^3$.

For the avoidance of doubt it will be understood by the skilled person that the polyolefin phase is not limited to homophasic materials, but that the polyolefin phase may also be heterophasic for example when an ethylene propylene copolymer is dispersed in a propylene homopolymer. In a preferred embodiment the polyolefin polyethylene, in particular low density polyethylene or LDPE.

The thermoplastic composition according to the invention mainly consists of polyolefin, thermoplastic starch and compatibiliser, i.e. at least 80 wt % of the thermoplastic composition is polyolefin, thermoplastic starch and compatibiliser.

Preferably, at least 90 wt % or at least 95 wt % of the thermoplastic composition is polyolefin, thermoplastic starch and compatibiliser.

In particular, the thermoplastic composition according to the invention preferably comprises less than 20 wt % of thermoplastic polyester, more preferably less than 15 wt %, more preferably less than 10 wt %, more preferably less than 5 wt %, more preferably less than 1 wt %, of thermoplastic polyester. Most preferably, the thermoplastic composition according to the invention is free from thermoplastic polyester.

It was found that the composition the thermoplastic composition according to the invention comprising a less amount of or no polyester resulted in an article having a smoother surface and a better dispersion of the thermoplastic starch in the composition.

If present, the polyester may form a co-continuous morphology with the thermoplastic starch so that in this embodiment the starch phase will comprise the thermoplastic starch, the thermoplastic polyester and at least part of the compatibiliser. It is believed that this embodiment results in a less polar starch phase which makes compatibilisation with the non-polar polyolefin phase more easy. To further improve the adhesion between the starch phase including the thermoplastic polyester and the polyolefin phase it is preferred that the thermoplastic composition comprises a further compatibiliser which is a polyolefin, preferably polyethylene, having at least 1 wt % and preferably at most 10 wt % maleic anhydride grafted thereon. In another embodiment the thermoplastic starch and the thermoplastic polyester do not form a co-continuous structure, but the thermoplastic polyester will, upon stretching, in machine direction and transverse direction form layers extending in the aforementioned directions, similar to the layers that the polyolefin phase form. In this specific embodiment the article hence comprises three layers that are stacked in random yet alternating manner. For example a layer of thermoplastic starch phase may be covered with a layer of thermoplastic polyester which in turn is covered by a layer of polyolefin phase. Alternatively the layer of thermoplastic starch phase may be covered by a layer of polyolefin phase which in turn is covered by a layer of thermoplastic polyester.

In particularly preferred embodiments of the present invention, the thermoplastic composition comprises the at least one polyolefin and the thermoplastic starch at a weight ratio of 20:80-55:45, preferably 20:80-50:50, more preferably 20:80-40:60, even more preferably 20:80-30:70; the amount of the compatibiliser is 5-15 wt %, preferably 5-10 wt %, more preferably 5-7.5 wt % based on the thermoplastic composition; the thermoplastic starch comprises plasticiser components and the weight ratio between the glycerol and the plasticiser components (glycerol and/or solbitol) is 0.3-1.0, preferably 0.4-0.9, more preferably 0.5-0.8; the polyolefin phase has an MFI of 2-15 g/10 min, more preferably 3-10 g/10 min, more preferably 3-5 g/10 min as measured according to ISO 1133 at 190° C. and 2.16 kg and/or the thermoplastic starch comprises borax, preferably at a concentration of 0.5 wt % to 8 wt %, more preferably 1 wt % to 4 wt %, most preferably 2 wt % to 3 wt %, based on the weight of the thermoplastic starch.

Particularly good oxygen barrier properties are observed in these embodiments.

Preferably the article according to the present invention is a film having a preferred thickness of from 2-250 μm and having a modulus of at least 50 MPa as measured according to ASTM 882 and an elongation at break of at least 200% as measured according to ISO 527-3.

The article, in particular the film, according to the present invention preferably has a coefficient of permeability for oxygen of at most 60, more preferably at most 50, more preferably at most 25, most preferably at most 10 (cm$^3$·mm)/(m$^2$·day) as measured according to ASTM D-3985 (23° C., 0% RH, 100% O2) on a film having a thickness of from 50-150 μm.

The article, in particular the film according to the present invention preferably has a coefficient of permeability for water vapour of at most 5, more preferably at most 3, most preferably at most 1 (g·mm/m$^2$·day) as measured according to ASTM E 96 (38° C., 100% RH) on a film having a thickness of from 50-150 μm.

The present invention further relates to a multilayer film comprising the article according to the present invention in the form of a film which is provided with at least one further synthetic film of a synthetic polymer extending in machine direction and transverse direction. In a preferred embodiment of such a multilayer film both an upper and a lower side of the inventive article in the form of a film are provided with a synthetic film. The synthetic polymer is preferably a polyolefin, such as polyethylene. The synthetic polymer may further comprise a compatibiliser, preferably selected from the group consisting of ethylene vinyl alcohol copolymers, block saponified polyvinyl acetate and random terpolymers of ethylene, butylacrylate and maleic anhydride. The amount of the compatibiliser may e.g. be 5-20 wt % of the synthetic polymer. Such further synthetic film may be provided on the inventive article by means of lamination or co-extrusion prior or after stretching in machine direction and transverse direction.

The article of the present invention may be produced either by providing a thermoplastic composition comprising at least one polyolefin, thermoplastic starch and at least one compatibiliser and feeding said thermoplastic composition to an extruder, extruding the thermoplastic composition through an extrusion die and stretching the thermoplastic composition upon exiting the extrusion die at elevated temperature in machine direction and transverse direction. In this embodiment the thermoplastic composition is preferably fed to the extruder in the form of pellets of the thermoplastic composition, which pellets were prepared in a separate extrusion process preceding the method for producing the article. Alternatively the article may be prepared by feeding a polyolefin or a mixture of two or more polyolefins, starch, at least one processing aid for making thermoplastic starch and at least one compatibiliser to an extruder, extruding these components under such conditions that a thermoplastic composition comprising at least one polyolefin, thermoplastic starch and at least one compatibiliser is formed in the extruder and stretching the thermoplastic composition upon exiting the extruder at elevated temperature via an extrusion die in machine direction and transverse direction.

The present inventors have observed that if the article according to the present invention is prepared using a two-step process, wherein in a first step pellets of the thermoplastic composition are produced, and wherein in a second step the pellets are fed to a device for processing said pellets into the article, that the pellets may show a more or less co-continuous structure (morphology) of the starch and polyolefin phase. Some pellets also showed some alternating layers of starch phase and polyolefin phase.

Preferably, after the first step, the pellets of the thermoplastic composition are brought to a certain moisture content before being subjected to the second step. For example, pellets comprising about 65 wt % of the thermoplastic starch may have a moisture content of 11-12 wt %.

The starch that is used in the process of the present invention is preferably used as such and is not dried or otherwise treated before being processed to thermoplastic starch.

The temperature during the extrusion process preferably does not exceed 180° C., more preferably 160° C. When exiting the extrusion die the thermoplastic composition is preferably at most 130° C.

The present invention will now be further explained by the following non limiting Figures and Examples.

FIG. 1 shows a model of the layered morphology of the article according to the present invention.

Figure 2:
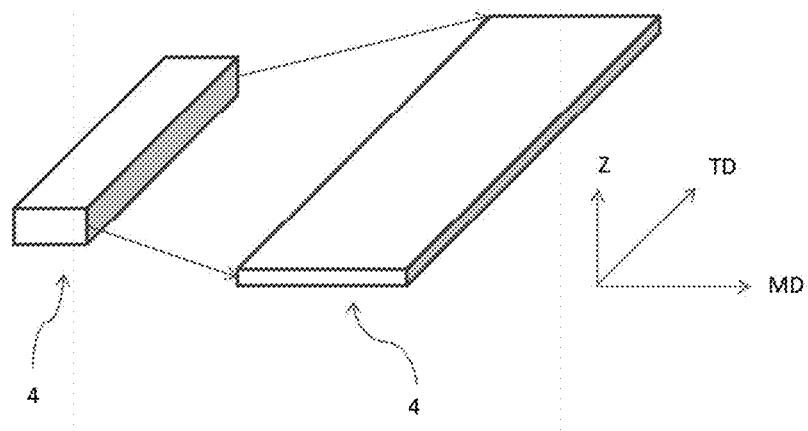

FIG. 2 schematically shows a method for producing the article according to the present invention.

FIG. 1 is a schematic representation of a biaxially stretched article 1 according to the present invention. The machine direction is indicated as MD, the transverse direction is indicated as TD and the thickness direction is indicated as Z. From FIG. 1 it is clear that the layers 2,3 extend in machine direction and transverse direction. The layers indicated with reference numeral 2 represent the polyolefin phase whereas the layers indicated with reference numeral 3 represent the starch phase. As can be clearly seen layers 2 and layers 3 alternate, i.e. the polyolefin phase layers 2 are stacked with the starch phase layers 3 in an alternating manner. The number of layers 2,3 predominantly depends on stretch ratios, thickness of the article and the thermoplastic composition. Article 1, not to scale, shows five layers 2,3 but the skilled person will understand that article 1 according to the present invention is not limited to such number of layers. In FIG. 1 the outer layers (i.e. the layers on the top and on the bottom of the stack) are shown to be layers of polyolefin. However, the present inventors have established that such outer layers may also be of thermoplastic starch.

By means of electron microscopy the present inventors have established that the layer thickness (i.e. the thickness in Z direction) of the starch phase may be from 0.1-50 µm, and the thickness of the polyolefin layers may be from 0.1-50 µm. Preferably the layers are at most 20 µm, more preferably at most 10 µm.

FIG. 2 schematically shows the stretching in machine and transverse direction for producing the article according to the present invention. Volume element 4 having a certain width in transverse direction, a certain length in machine direction (MD) and thickness in thickness direction is biaxially stretched, meaning it is stretched in machine direction and transverse direction. As a consequence of the stretching in machine direction and transverse direction the thickness in thickness direction Z will decrease. Article 1 of the present invention is not a foam and consequently the density of volume element 4 remains substantially unchanged upon the stretching in machine and transverse direction. In the embodiment where the article of the present invention is manufactured by means of film blowing the stretch ratio in machine direction is equal to the ratio of take up speed of the blown film and the speed of the extrudate leaving the extrusion die. Such has been defined as ratio for "draw down" in U.S. Pat. No. 5,082,616 for example.

EXAMPLES

Experiment Set 1

Blends of polyethylene granules and thermoplastic starch granules were compounded on a co-rotating twin screw extruder to produce a strand. Pieces of the strand were observed by a light microscopy to examine their homogeneity and morphology.

Smooth appearance/low roughness of the surface of the strand and high homogeneity in the observed microstructure indicate that a blown film made from the same composition has a high gloss and low haze and is highly transparent. Rough surface and low homogeneity indicate that a blown film made from the same composition has a disturbed appearance.

Materials

The LDPE was LD2404, commercially available from SABIC having an MFI of about 4 g/10 min as measured according to ISO 1133 at 190° C. and 2.16 kg and having a density of about 924 kg/m³. The polyester was Ecoflex F blend C1200, commercially available from BASF, having an MFI at 190° C. and 2.16 kg of between 2.4 and 4.5 g/10 min. Three types of compatibilisers were used: Lotader 3410 (supplier: Arkema) which is a random terpolymer of ethylene, butylacrylate and maleic anhydride; Yparex 9603 (supplier: Yparex) which is polyethylene having at least 1 wt % maleic anhydride grafted thereon and Orevac 9305 (Arkema) which is a random terpolymer of ethylene, vinylacetate and maleic anhydride. TPS with borax comprises 2.4 wt % of borax and 28.6 wt % of glycerol with respect to the weight of the TPS. TPS without borax comprises no borax and 29.3 wt % of glycerol with respect to the weight of the TPS.

The thermoplastic starch (TPS) composition was prepared by feeding the starch, glycerol, borax and regular processing agents to a first zone of a twin screw co-rotating extruder. The temperature profile of the extruder was 40-80-110-130-130-110° C. at a screw speed of 123 rpm. The thermoplastic starch was formed in the extruder. To avoid degradation and/or yellowing of the starch the temperature of the last zone of the extruder including the extrusion die was reduced to about 110° C. The starch was used as such, i.e. it was not dried or otherwise treated before feeding to the extruder.

The polyethylene/thermoplastic starch (TPS) compounds forming the basis of the article according to the present invention were prepared by feeding the dry blend of polyethylene and the thermoplastic starch granules as prepared above and the compatibilizer and other additives to a first zone of a twin screw co-rotating extruder. The temperature profile of the extruder was 120-150-160-160-160-140-110° C. at a screw speed of 110 rpm and a torque of 63-73 Nm.

Strand of each compound has been collected and the roughness and homogeneity has been determined.

In Table 1 the composition of the polyethylene/thermoplastic starch (expressed in wt %) is listed.

TABLE 1

| | LD 2404 | Polyester | Lotader 3410 | Yparex 9603 | Orevac 9305 | TPS with borax | TPS without borax | roughness | dispersion quality |
|---|---|---|---|---|---|---|---|---|---|
| comp. ex. A | 56 | 0 | 0 | 0 | 9 | 0 | 36 | rough | 0 |
| example 1 | 56 | 0 | 9 | 0 | 0 | 0 | 36 | smooth | 0 |
| comp. ex. B | 22 | 33 | 9 | 0 | 0 | 36 | 0 | very rough | − |
| example 2 | 56 | 0 | 9 | 0 | 0 | 36 | 0 | smooth | ++ |
| example 3 | 47 | 0 | 9 | 9 | 0 | 36 | 0 | smooth | +++ |

Dispersion quality
+++ very fine
++ fine
+ reasonably fine
0 many drops
− bad

Comparing comp ex A and ex 1, it can be understood that use of a random terpolymer of ethylene, butylacrylate and maleic anhydride results in a smooth surface compared to the use of a random terpolymer of ethylene, vinylacetate and maleic anhydride.

Comparing comp ex B and ex 2, it can be understood that the addition of polyester results in a rough surface and a bad dispersion quality.

Comparing ex 1 and ex 2, it can be understood that the addition of borax has an advantage that it improves dispersion quality.

Comparing ex 2 and ex 3, it can be understood that the addition of polyethylene having at least 1 wt % maleic anhydride grafted thereon further improves the dispersion quality.

Experiment Set 2

Polyethylene and thermoplastic starch were compounded on a co-rotating twin screw extruder and the obtained compound was used as the middle layer in three layer blown films. The outer layers of that three layer blown film consist of polyethylene or a dry blend of polyethylene and the random terpolymer of ethylene, bytylarcylate and maleic anhydride (Lotader 3410).

Materials

LDPE: LD2404 commercially available from SABIC having an MFI of about 4 g/10 min as measured according to ISO 1133 at 190° C. and 2.16 kg and having a density of about 924 kg/m³ and LD2008 commercially available from SABIC having an MFI at 190° C. and 2.16 kg of about 8 g/10 min as measured according to ISO 1133 at 190° C. and 2.16 kg and having a density of about 920 kg/m³. Type of compatibiliser used: Lotader 3410 (supplier: Arkema) which is a random terpolymer of ethylene, butylacrylate and maleic anhydride The polyethylene/thermoplastic starch composition forming the basis of the article according to the present invention was prepared by feeding the starch, glycerol, borax and the polyethylene components and the compatibilizer and other additives to a first zone of a twin screw co-rotating extruder. The temperature profile of the extruder was 30-60-110-160-160-110° C. at a screw speed of 80 rpm and a torque of 60-110 Nm. The thermoplastic starch was formed in the first zones of the extruder before the polyolefin started to melt. To avoid degradation and/or yellowing of the starch the temperature of the last zone of the extruder including the extrusion die was reduced to about 110° C. The starch was used as such, i.e. it was not dried or otherwise treated before feeding to the extruder.

On a three layer blown film machine the polyethylene/thermoplastic starch material as described above was used for the inner layer while polyethylene or a dry blend of polyethylene and the random terpolymer Lotader 3410 was used for the outer layer. The temperature of the extruders (feeding the separate materials) was 125-140-135-130–130° C. at a screw speed of 50 rpm, line speed of 9 m/min and throughput rate of about 20 kg/hr.

The blow up rate (BUR) of all the three layer materials was 3.

In Table 2 the composition, the quality and the oxygen permeability coefficient and the water vapour coefficient of the three layer blown films are listed.

The composition of the inner layers in these three layer films are summarized in Table 3.

TABLE 2 three layer film

| inner layer | outer layer | ratio inner/outer | quality | film thickness (μm) | oxygen [cc · mm]/ [m² · day] average [23° C. 0% RH] | water [g · mm]/ [m² · day] average [38° C. 100% RH] | Gloss 45° ASTN D2456 | Haze ASTM D1003 |
|---|---|---|---|---|---|---|---|---|
| LD2404 | LD2404 | 70/30 | Transparent | 56 | 219 | 0.7 | 53 | 12.2 |
| layer 1 | LD2008 | 70/30 | Transparent | 75 | 34.6 | 1.5 | | |
| layer 2 | LD2008 | 70/30 | Transparent | 53 | 53.7 | 1.5 | 52.4 | 17.3 |
| layer 2 | LD2008 | 80/20 | Transparent | 57 | 46 | 1.6 | 44.4 | 16.7 |
| layer 2 | LD2008/ Lotader 3410 (90/10) | 70/30 | Transparent | 49 | 56.8 | 1.7 | 53.2 | 15.0 |
| layer 3 | LD2008/ Lotader 3410 (90/10) | 60/40 | very disturbed | | | | 14.4 | 68.3 |

TABLE 3 inner layer

| components (wt %) | Layer 1 | Layer 2 | Layer 3 |
|---|---|---|---|
| LDPE1 (LD2404) | 35.5 | | |
| LDPE2 (LD2008) | | 35.5 | 13.5 |
| Starch | 29.4 | 29.4 | 52.3 |
| Glycerol | 19.8 | 19.8 | 23.4 |
| Borax | 1.1 | 1.1 | 2.0 |
| Lotader 3410 | 11.8 | 11.8 | 4.5 |
| Others | 2.4 | 2.4 | 4.3 |

It can be seen that three layer films were obtained with a good oxygen barrier property and a good water barrier property according to the invention.

If the weight ratio of polyethylene over the thermoplastic starch becomes too low, e.g. less than 20:80, then the morphology of the polyethylene/thermoplastic starch blown film is not co-continuous anymore resulting into significant lower oxygen and water barrier properties.

Experiment Set 3

Polyethylene and thermoplastic starch were compounded on a co-rotating twin screw extruder and the obtained compound was used as the middle layer in three layer blown films.

Materials

LDPE:

Nexcoat 5, commercially available from SABIC having an MFI of about 5 g/10 min as measured according to ISO 1133 at 190° C. and 2.16 kg and having a density of about 919 kg/m³

LD2404, commercially available from SABIC having an MFI of about 4 g/10 min as measured according to ISO 1133 at 190° C. and 2.16 kg and having a density of about 924 kg/m³

LD2008, commercially available from SABIC having an MFI of about 8 g/10 min as measured according to ISO 1133 at 190° C. and 2.16 kg and having a density of about 920 kg/m³

LD2015, commercially available from SABIC having an MFI of about 15 g/10 min as measured according to ISO 1133 at 190° C. and 2.16 kg and having a density of about 920 kg/m³

Compatibiliser:

Lotader 3410 (supplier: Arkema) which is a random terpolymer of ethylene, butylacrylate and maleic anhydride Granules for Inner Layer of Three Layer Blown Film Powder mixtures of starch, borax (if any) and regular processing agents were dry blended and dosed in the throat of an extruder. Pellet mixtures of LDPE and Lotader 3410 were also dosed in the throat of the extruder. Glycerol was heated up to 50° C. and gravimetrically fed to the extruder just after the throat of the extruder. The compositions are shown in Table A.

The temperature profile of the extruder was 40-80-135-160-160-160-110–95° C. at a screw speed of 225 rpm. The thermoplastic starch was formed in the first zones of the extruder before the LDPE started to melt. Strands from the die were cut into granules with underwater cutter equipment (LPU).

Blown Film

Three layer blown films were made by an extruder using the obtained granules for the inner layer and LDPE or dry blend of LDPE and Lotader 3410 for the outer layers. The weight ratio between the inner layer and the outer layers was 70:30.

The temperature profile of the extruders was 125-140-135-130–130° C. at a screw speed of 50 rpm, line speed of 9 m/min and throughput rate of about 20 kg/hr. The blow up rate (BUR) of all the three layer materials was 3.

Experiments 3-1

The effects of the TPS content and Lotader 3410 content were investigated. The outer layers of the three layer blown film were made of Nexcoat 5.

TABLE 3-1

| components of inner layer (wt %) | 1.1 | 1.2 | 1.3 | 1.4 | 1.5 |
|---|---|---|---|---|---|
| Nexcoat 5 | 43.62 | 34.71 | 20.92 | 48.16 | 25.64 |
| Starch | 29.78 | 36.05 | 44.19 | 29.78 | 44.19 |
| Glycerol | 12.90 | 15.79 | 19.89 | 12.90 | 19.89 |
| Borax | 1.11 | 1.35 | 1.65 | 1.11 | 1.65 |
| Lotader 3410 | 10.14 | 9.15 | 9.73 | 5.60 | 5.01 |
| Others | 2.45 | 2.95 | 3.62 | 2.45 | 3.62 |
| total | 100 | 100 | 100 | 100 | 100 |
| glycerol/starch ratio | 0.43 | 0.44 | 0.45 | 0.43 | 0.45 |
| TPS in total (wt %) (starch + glycerol + borax) | 43.79 | 53.19 | 65.73 | 43.79 | 65.73 |
| ratio PE:TPS | 50:50 | 39:61 | 24:76 | 52:48 | 28:72 |
| Borax in TPS (wt %) | 2.5 | 2.5 | 2.5 | 2.5 | 2.5 |
| Properties of film | | | | | |
| oxygen [cc · mm]/ [m² · day] average [23° C., 0% RH] | 104 | 42 | 15 | 48 | 1.44 |
| water [g · mm]/ [m² · day] average [38° C., 100% RH] | 1.2 | 1.4 | 1.6 | 1.2 | 2.5 |

The increase in the TPS amount in the inner layer leads to improvement in the oxygen barrier property of the film, as can be understood by comparison of films with inner layers 1.1, 1.2 and 1.3 (compatibiliser about 10 wt %) and comparison of films with inner layers 1.4 and 1.5 (compatibiliser about 5 wt %).

The decrease in the compatibiliser amount in the inner layer leads to improvement in the oxygen barrier property of the film, as can be understood by comparison of films with inner layers 1.1 and 1.4 (TPS 43.79 wt %) and comparison of films with layer 1.3 and 1.5 (TPS 65.73 wt %%).

Experiments 3-2

The effects of the MFI of the LDPE in the inner layer of the film were investigated. The outer layers of the three layer blown film were made of 80 wt % of LD2008 and 20 wt % of Lotader 3410.

TABLE 3-2

| components (wt %) | 2.1 | 2.2 | 2.3 | 2.4 | 2.5 |
|---|---|---|---|---|---|
| LDPE Type | Nexcoat 5 | LD2015 | LD2404 | LD2008 | LD2015 |
| MFI (g/10 min) | 5 | 15 | 4 | 8 | 15 |
| LDPE | 25.64 | 25.64 | 22.71 | 22.71 | 22.71 |
| Starch | 44.19 | 44.19 | 40.29 | 40.29 | 40.29 |
| Glycerol | 19.89 | 19.89 | 26.96 | 26.96 | 26.96 |
| Borax | 1.65 | 1.65 | 1.50 | 1.50 | 1.50 |
| Lotader 3410 | 5.01 | 5.01 | 5.24 | 5.24 | 5.24 |
| Others | 3.62 | 3.62 | 3.30 | 3.30 | 3.30 |
| total | 100 | 100 | 100 | 100 | 100 |
| glycerol/starch ratio | 0.45 | 0.45 | 0.67 | 0.67 | 0.67 |
| TPS in total (starch + glycerol + borax) | 65.73 | 65.73 | 68.75 | 68.75 | 68.75 |
| ratio PE:TPS | 28:72 | 28:72 | 25:75 | 25:75 | 25:75 |
| Borax in TPS (wt %) | 2.5 | 2.5 | 2.2 | 2.2 | 2.2 |
| oxygen [cc · mm]/ [m² · day] average [23° C., 0% RH] | 1.44 | 3.75 | 0.49 | 1.12 | 2.77 |
| water [g · mm]/ [m² · day] average [38° C., 100% RH] | 2.5 | 2.3 | 3.0 | 2.1 | 1.8 |

The decrease in the MFI of the LDPE in the inner layer leads to improvement in the oxygen barrier property of the film, as can be understood by comparison of films with inner layers 2.3, 2.4 and 2.5 (glycerol/starch ratio 0.67).

The increase in the glycerol/starch ratio leads to improvement in the oxygen barrier property of the film, as can be understood by comparison of films with inner layers 2.2 and 2.5.

Experiments 3-3

The effects of the presence of borax in the inner layer of the film were investigated. The outer layers of the three layer blown film were made of LD2008.

TABLE 3-3

| components (wt %) | 3.1 | 3.2 | 3.3 |
|---|---|---|---|
| LD2008 | 25.37 | 22.71 | 22.71 |
| Starch | 46.51 | 41.68 | 40.97 |
| Glycerol | 19.89 | 26.96 | 26.96 |
| Borax | 0 | 0 | 1.53 |
| Lotader 3410 | 5.28 | 5.24 | 5.24 |
| Others | 2.95 | 3.41 | 2.59 |
| total | 100 | 100 | 100 |
| glycerol/starch ratio | 0.43 | 0.65 | 0.66 |
| TPS in total (wt %) (starch + glycerol + borax) | 66.4 | 68.64 | 69.46 |
| ratio PE:TPS | 28:72 | 25:75 | 25:75 |
| Borax in TPS (wt %) | 0 | 0 | 2.2 |
| oxygen [cc · mm]/ [m2 · day] average [23° C., 0% RH] | 6.4 | 2.18 | 0.145 |
| water [g · mm]/ [m2 · day] average [38° C., 100% RH] | 1.9 | 1.7 | 1.9 |

The increase in the glycerol/starch ratio leads to improvement in the oxygen barrier property of the film, as can be understood by comparison of films with inner layers 3.1 and 3.2.

The presence of borax in the inner film leads to improvement in the oxygen barrier property of the film, as can be understood by comparison of films with inner layers 3.2 and 3.3.

The invention claimed is:

1. A biaxially stretched article obtained by stretching a thermoplastic composition in a machine direction and a transverse direction at elevated temperature, said thermoplastic composition comprising:
   a polyolefin phase containing a polyolefin,
   a starch phase containing thermoplastic starch,
   compatibiliser selected from the group consisting of ethylene vinyl alcohol copolymers, block saponified polyvinyl acetate and random terpolymers of ethylene, butylacrylate and maleic anhydride,
   wherein the total of the polyolefin, the thermoplastic starch and the compatibiliser is more than 80 wt % of the weight of the thermoplastic composition; and
   wherein the article has a layered morphology with alternating layers of starch phase and polyolefin phase, said layers of starch phase and polyolefin phase extending in machine direction and transverse direction;
   wherein the thermoplastic composition comprises
     from 10-70 wt % of the polyolefin
     from 10-70 wt % of the thermoplastic starch
     from 5-40 wt % of the compatibiliser
   the weight percentages being based on the weight of the thermoplastic composition; and
   wherein the thermoplastic starch comprises borax at a concentration of 0.5 wt % to 8 wt %.

2. The article according to claim 1, wherein the thermoplastic composition comprises the polyolefin and the thermoplastic starch at a weight ratio of 20:80-55:45.

3. The article according to claim 1, wherein the amount of the compatibiliser is 5-15 wt % based on the thermoplastic composition.

4. The article according to claim 1, wherein the thermoplastic starch comprises glycerol and plasticiser components and the weight ratio between the glycerol and the plasticiser components is 0.3-1.0.

5. The article according to claim 1, wherein the thermoplastic composition comprises a further compatibiliser different from the compatibiliser.

6. The article according to claim 5, wherein the further compatibiliser is selected from the group consisting of ethylene acrylic acid copolymers, ethylene vinyl acetate copolymers, polyolefins having at least 1 wt % maleic anhydride grafted thereon, random, partially hydrolised and saponified polyvinylacetate and random terpolymers of ethylene, vinylacetate and maleic anhydride.

7. The article according to claim 1, wherein the thermoplastic composition comprises at least 90 wt % of the polyolefin, the thermoplastic starch and the compatibiliser.

8. The article according to claim 1, having a stretch ratio in transverse direction of at least 1.5, the stretch ratio in transverse direction being defined as:

$$SR_{td} = \frac{W_1}{W_0}$$

and a stretch ratio in machine direction of at least 2, the stretch ratio in machine direction being defined as:

$$SR_{md} = \frac{T_0}{T_1 \times SR_{td}}$$

wherein
$SR_{md}$=Stretch ratio in machine direction
$SR_{td}$=Stretch ratio in transverse direction
$W_0$=Width of the thermoplastic composition before stretching in transverse direction [mm]
$W_1$=Width of the biaxially stretched article [mm]
$T_0$=Thickness of the thermoplastic composition before stretching in machine and transverse direction [mm]
$T_1$=Thickness of the biaxially stretched article [mm].

9. The article according to claim 1, wherein the article is a film having a thickness of from 2-250 µm, a modulus of at least 50 MPa as measured according to ASTM 882, and an elongation at break of at least 200% as measured according to ISO 527-3.

10. A multilayer film comprising the film according to claim 9, wherein said film is provided with a further synthetic film of a synthetic polymer extending in machine direction and transverse direction.

11. The article according to claim 1, wherein the article is a silage film.

12. A silage film consisting of an article according claim 1.

13. A method for producing an article according claim 1, comprising;
providing a thermoplastic composition comprising polyolefin, thermoplastic starch and compatibiliser comprising at least one of ethylene vinyl alcohol copolymers, block saponified polyvinyl acetate and random terpolymers of ethylene, butylacrylate and maleic anhydride, wherein the total of the polyolefin, the thermoplastic starch and the compatibiliser is more than 80 wt % of the weight of the thermoplastic composition, and feeding said thermoplastic composition to an extruder, extruding the thermoplastic composition through an extrusion die and stretching the thermoplastic composition upon exiting the extrusion die at elevated temperature, that is above the melting points of both the thermoplastic starch and the polyolefin, in machine direction and transverse direction,
or
feeding a polyolefin or a mixture of two or more polyolefins, starch, processing aid for making thermoplastic starch and compatibiliser comprising at least one of ethylene vinyl alcohol copolymers, block saponified polyvinyl acetate and random terpolymers of ethylene, butylacrylate and maleic anhydride to an extruder, extruding these components under such conditions that a thermoplastic composition comprising polyolefin, thermoplastic starch and compatibiliser, wherein the total of the polyolefin, the thermoplastic starch and the compatibiliser is more than 80 wt % of the weight of the thermoplastic composition, is formed in the extruder and stretching the thermoplastic composition upon exiting the extruder via an extrusion die at elevated temperature, that is above the melting points of both the thermoplastic starch and the polyolefin, in machine direction and transverse direction.

14. The article according to claim 1, wherein the thermoplastic composition is free from thermoplastic polyester.

15. The article according to claim 1, wherein the article has an oxygen permeability of at most 50 (cm³·mm)/(m²·day) as measured according to ASTM D-3985 at 23° C., 0% relative humidity, and 100% oxygen.

16. The article according to claim 15, wherein the article has an oxygen permeability of at most 25 (cm³·mm)/(m²·day).

17. A biaxially stretched article obtained by stretching a thermoplastic composition in a machine direction and a transverse direction at elevated temperature, said thermoplastic composition comprising:
a polyolefin phase containing a polyolefin,
a starch phase containing thermoplastic starch,
compatibiliser selected from the group consisting of ethylene vinyl alcohol copolymers, block saponified polyvinyl acetate and random terpolymers of ethylene, butylacrylate and maleic anhydride,
wherein the total of the polyolefin, the thermoplastic starch and the compatibiliser is more than 80 wt % of the weight of the thermoplastic composition and
wherein the article has a layered morphology with alternating layers of starch phase and polyolefin phase, said layers of starch phase and polyolefin phase extending in machine direction and transverse direction; and
wherein the thermoplastic starch comprises borax.

18. The article according to claim 17, wherein the thermoplastic starch comprises the borax at a concentration of 1 wt % to 4 wt %, based on the weight of the thermoplastic starch.

19. The article according to claim 18, wherein the thermoplastic starch comprises the borax at a concentration of 2 wt % to 3 wt %, based on the weight of the thermoplastic starch.

20. The article according to claim 17, wherein the thermoplastic composition comprises less than 20 wt % of thermoplastic polyester based on the total of the thermoplastic composition and wherein the thermoplastic starch comprises the borax at a concentration of at a concentration of 0.5 wt % to 8 wt %.

* * * * *